(12) United States Patent
Graves

(10) Patent No.: US 12,255,527 B2
(45) Date of Patent: Mar. 18, 2025

(54) HYSTERETIC POWER SUPPLY CONTROL METHOD

(71) Applicant: L3Harris Technologies, Inc., Melbourne, FL (US)

(72) Inventor: Justin Malcolm Graves, Middletown, OH (US)

(73) Assignee: L3Harris Technologies, Inc., Melbourne, FL (US)

( * ) Notice: Subject to any disclaimer, the term of this patent is extended or adjusted under 35 U.S.C. 154(b) by 327 days.

(21) Appl. No.: 18/100,262

(22) Filed: Jan. 23, 2023

(65) Prior Publication Data

US 2024/0250605 A1 Jul. 25, 2024

(51) Int. Cl.
*H02M 1/32* (2007.01)
*H02M 1/00* (2006.01)
*H02M 3/158* (2006.01)

(52) U.S. Cl.
CPC ........... *H02M 1/32* (2013.01); *H02M 1/0009* (2021.05); *H02M 3/158* (2013.01)

(58) Field of Classification Search
CPC ....... H02M 1/32; H02M 1/0009; H02M 3/158
See application file for complete search history.

(56) References Cited

U.S. PATENT DOCUMENTS

| | | | | |
|---|---|---|---|---|
| 2011/0089925 A1* | 4/2011 | Ishida | ................. | H02M 3/1563 323/285 |
| 2012/0249094 A1* | 10/2012 | Zhao | ....................... | H02M 3/00 307/11 |
| 2013/0342181 A1* | 12/2013 | Suppanz | ............. | H02M 3/1584 323/271 |
| 2015/0244164 A1* | 8/2015 | Li | ...................... | H03K 17/0822 361/87 |

* cited by examiner

*Primary Examiner* — Rafael O De Leon Domenech
(74) *Attorney, Agent, or Firm* — Edell, Shapiro & Finnan, LLC

(57) ABSTRACT

A method of controlling a switching power supply comprises: generating a pulse train; applying the pulse train to a switching transistor of the switching power supply to cause switching of the switching transistor on and off to convert an input voltage applied to the switching transistor to an output voltage, which rises while switching the switching transistor on and off and falls while not switching the switching transistor on and off; and performing hysteretic voltage control of the output voltage by first controlling dropping pulses of the pulse train so that the output voltage remains between hysteretic voltage thresholds including an overvoltage threshold and an undervoltage threshold that is less than the overvoltage threshold.

20 Claims, 9 Drawing Sheets

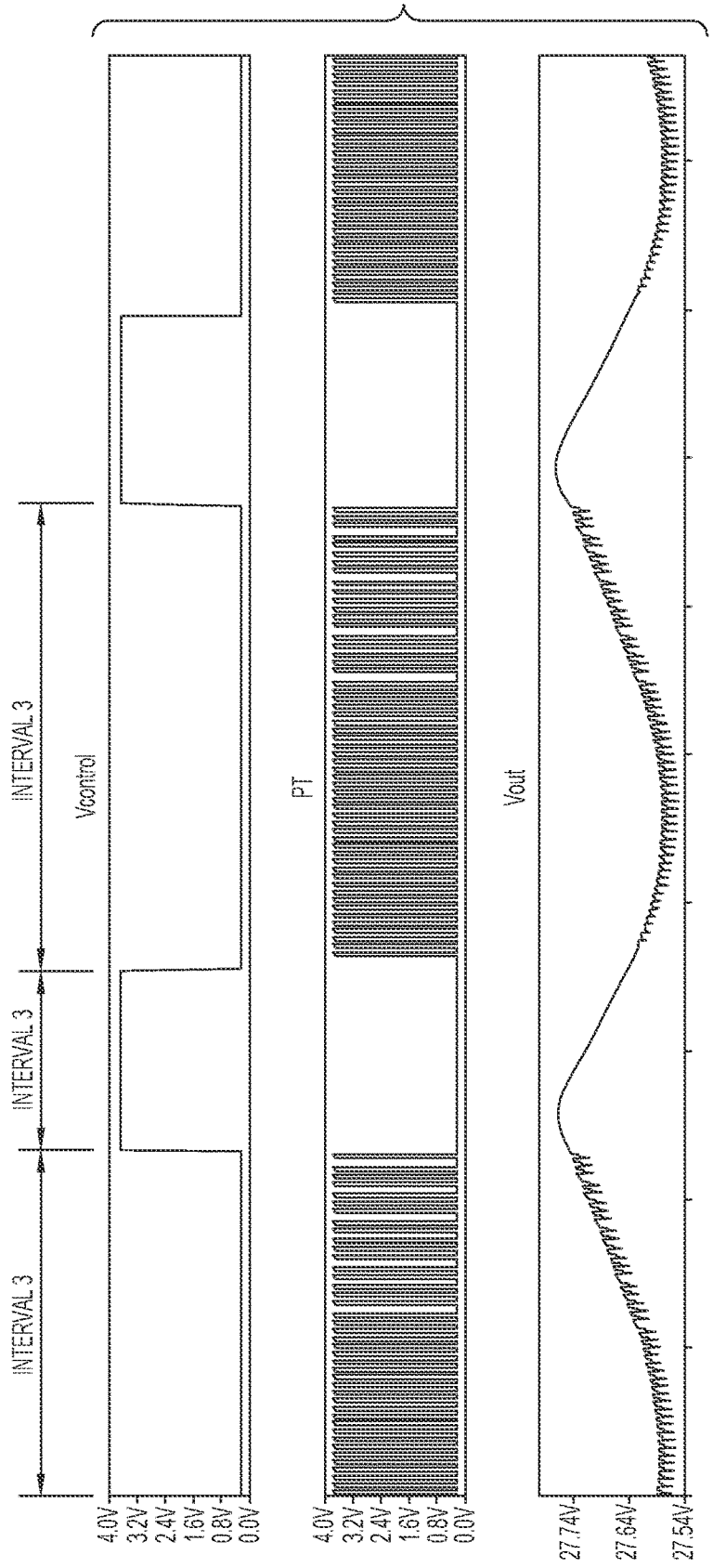

HYSTERETIC POWER SUPPLY CONTROL METHOD

TECHNICAL FIELD

The present disclosure relates generally to controlling switching power supplies.

BACKGROUND

Conventional pulse modulation varies an on-time of pulses, or a frequency of the pulses, applied to a switching transistor of a switching power supply in order to control an output voltage of the switching power supply. Such control can be slow to respond to or account for fast output voltage transients, which can result in damage to circuit components. Moreover, designing magnetics of the switching power supply to match varying pulse on-times is difficult.

BRIEF DESCRIPTION OF THE DRAWINGS

FIG. 3 show example voltage waveforms for a pulse train applied to a switching transistor, a control voltage to control the pulse train, and an output voltage in the power supply system when the power supply is operating under the hysteretic voltage control.

DESCRIPTION OF EXAMPLE EMBODIMENTS

Overview

In an embodiment, a method of controlling a switching power supply comprises: generating a pulse train; applying the pulse train to a switching transistor of the switching power supply to cause switching of the switching transistor on and off to convert an input voltage applied to the switching transistor to an output voltage, which rises while switching the switching transistor on and off and falls while not switching the switching transistor on and off; and performing hysteretic voltage control of the output voltage by first controlling dropping pulses of the pulse train so that the output voltage remains between hysteretic voltage thresholds including an overvoltage threshold and an undervoltage threshold that is less than the overvoltage threshold. Switching the switching transistor on and off also causes the switching power supply to generate an output current that rises and falls in correspondence with an output load. The method further comprises: performing hysteretic current control of the output current by second controlling dropping the pulses of the pulse train so that the output current remains between hysteretic current thresholds including an overcurrent threshold and an undercurrent threshold.

Example Embodiments

Figure 1:
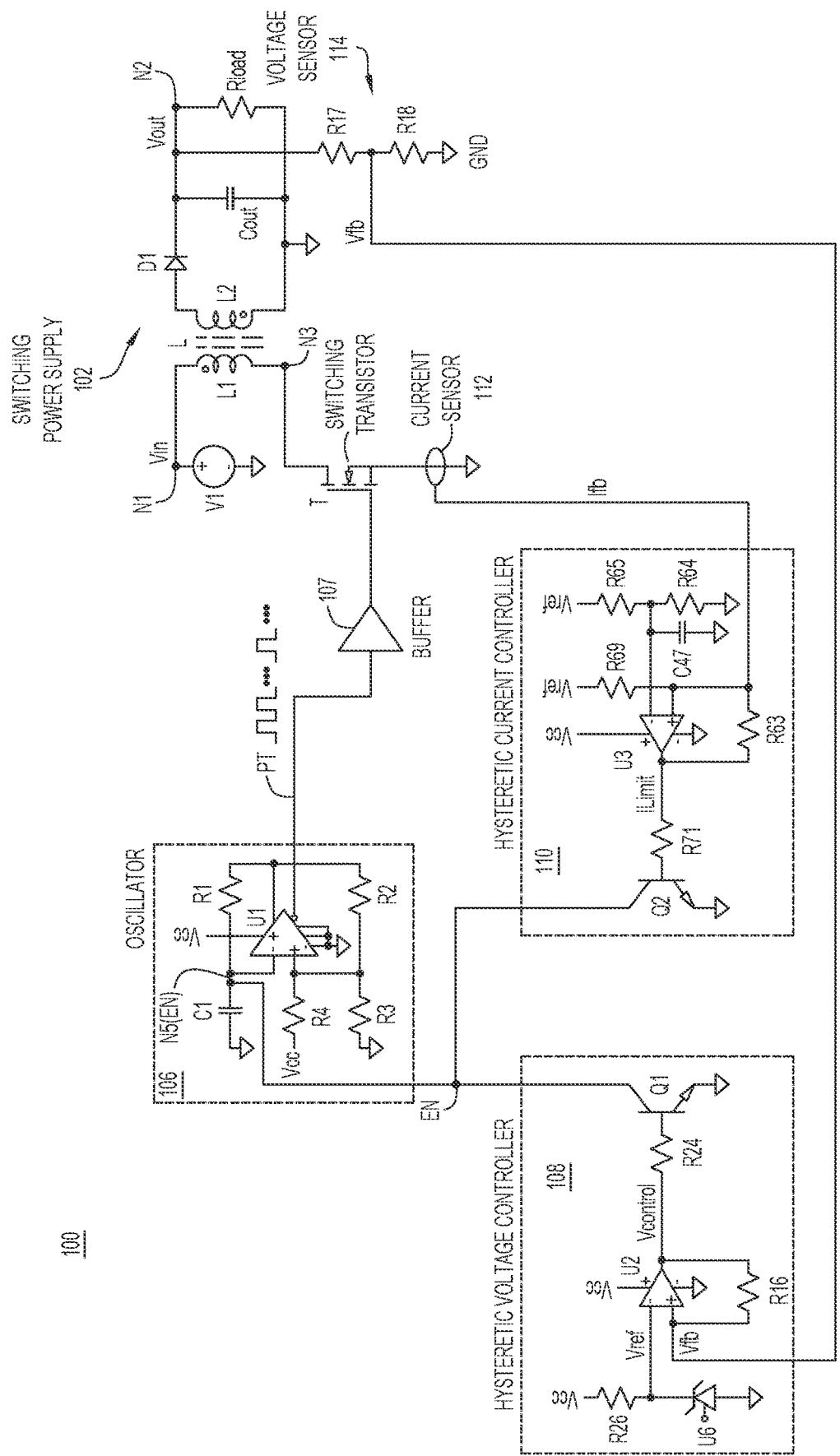
FIG. 1 is a circuit diagram of an example power supply system in which hysteretic output voltage and hysteretic output current control techniques may be implemented.

FIG. 1 is a circuit diagram of an example power supply system 100 in which hysteretic voltage and current control techniques may be implemented. Power supply system 100 includes a switching power supply 102 having a switching transistor T, an oscillator 106 to generate a pulse train PT when the oscillator is enabled and to apply the pulse train to the switching transistor through a buffer 107, a hysteretic voltage controller 108 to perform hysteretic voltage control of the switching power supply, a hysteretic current controller 110 (also referred to as a hysteretic current limiter) to perform hysteretic current control of the switching power supply, a current sensor 112, and a voltage sensor 114.

Switching transistor T switches on and off responsive to the pulse train PT. The switching causes switching power supply 102 to convert an input voltage Vin supplied to the switching power supply to an output voltage Vout and a corresponding output current Iout supplied to a load Rload. Output voltage Vout and output current Iout rise when pulse train PT is present, and fall when the pulse train is not present. Voltage sensor 114 senses output voltage Vout and provides a feedback voltage Vfb indicative of Vout to hysteretic voltage controller 108. Current sensor 112 senses a current flowing through switching transistor T that is indicative of output current Iout and provides a feedback current Ifb indicative of output current Iout to hysteretic current controller 110.

According to embodiments presented herein, hysteretic voltage controller 108 (i) derives hysteretic voltage thresholds including an overvoltage threshold OV (also referred to as an upper voltage threshold) and an undervoltage threshold UV (also referred to as a lower voltage threshold) that is less than the overvoltage threshold based in part on a reference voltage Vref, (ii) compares the hysteretic voltage thresholds against output voltage Vout (e.g., indirectly using feeback voltage Vfb), and (iii) based on a result of the compare, controls an enable voltage EN applied to oscillator 106 to either enable or disable the oscillator (and hence either turn on or turn off pulse train PT, respectively) to control output voltage Vout. For example, hysteretic voltage controller 108 holds enable voltage EN at an enable level (e.g., a high level) to enable oscillator 106 (and hence pulse train PT). On the other hand, hysteretic voltage controller 108 holds enable voltage EN at a disable level (e.g., a low level) to disable oscillator 106 (and hence pulse train PT).

Similarly, hysteretic current controller 110 derives hysteretic current thresholds including an overcurrent threshold OC (also referred to as an upper current threshold) and an undercurrent threshold UC (also referred to as a lower current threshold) that is less than the overcurrent threshold based in part of reference voltage Vref. Hysteretic current controller 110 compares the hysteretic current thresholds against output current Iout (e.g., indirectly using Ifb), and controls enable voltage EN to either enable or disable the oscillator (and correspondingly pulse train PT) based on the comparison to limit output current Iout.

Figure 2:
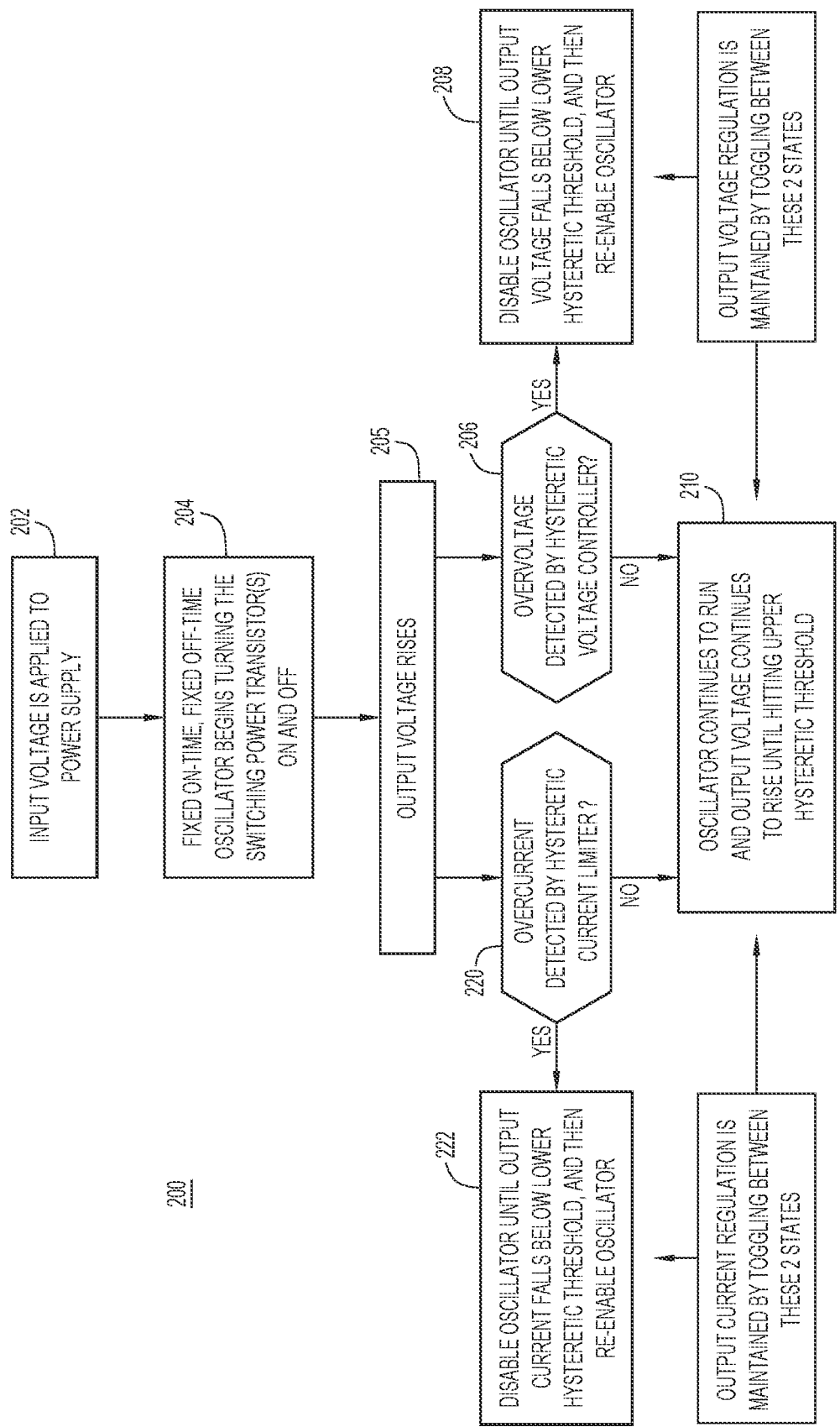
FIG. 2 is a flowchart of an example method of concurrent hysteretic voltage control and hysteretic current control performed by the power supply system.

FIG. 2 is a flowchart of an example high-level method 200 of concurrent hysteretic voltage and hysteretic current control performed in power supply system 100.

At 202, input voltage Vin is applied to switching power supply 102.

Initially, at 204, hysteretic voltage controller 108 and hysteretic current controller 110 maintain enable voltage EN at its enable level to enable oscillator 106 to generate pulse train PT and apply the pulse train to switching transistor T. In an example, the pulses of pulse train PT have a fixed on-time and a fixed off-time. That is, each of the pulses has the same on-time and each of the pulses has the same off-time In addition, the pulses have a fixed frequency (i.e., a fixed pulse repetition interval (PRI) or period defined between consecutive rising edges of pulses of the pulse train). In response to pulse train PT, switching transistor T switches on and off at the frequency (i.e., the switching frequency), to convert input voltage Vin to output voltage Vout and output current Iout. As used herein, the term "switching cycle" corresponds to the period of pulse train PT.

Responsive to the conditions established at 204, at 205, output voltage Vout rises and output current Iout rises from initial low levels (e.g., zero levels during a startup phase of switching power supply 102) while switching transistor T switches or cycles on and off in response to pulse train PT. Flow proceeds from 205 to 206 and 220 in parallel.

At 206, hysteretic voltage controller 108 detects whether output voltage Vout rises above or exceeds the overvoltage threshold, which represents an overvoltage condition. To do this, hysteretic voltage controller 108 compares output voltage Vout to the overvoltage threshold. When output voltage Vout exceeds the overvoltage threshold, flow proceeds to 208. When output voltage Vout does not exceed the upper voltage threshold, flow proceeds to 210.

At 208, hysteretic voltage controller 108 drives control voltage EN to its disable level to disable oscillator 106. In response, oscillator 106 stops generating pulse train PT, which is no longer applied to switching transistor T. When/while pulse train PT is not present, switching transistor T stops switching on and off, so output voltage Vout falls. While output voltage Vout falls, hysteretic voltage controller 108 detects whether/when output voltage Vout falls below the undervoltage threshold, which is an undervoltage condition. To do this, hysteretic voltage controller 108 compares output voltage Vout to the undervoltage threshold. While output voltage Vout does not fall below the undervoltage threshold, hysteretic voltage controller 108 continues to disable oscillator 106 and thereby suppress pulse train PT. When output voltage Vout finally falls below the undervoltage threshold, hysteretic voltage controller 108 causes enable voltage EN to transition to its enable level to re-enable oscillator 106, which supplies pulse train PT to switching transistor. Then, switching of switching transistor T responsive to pulse train PT causes output voltage Vout to rise above the undervoltage threshold and toward the overvoltage threshold. In summary, operation 208 disables oscillator 106 to suppress pulse train PT until output voltage Vout falls below the undervoltage threshold, and then re-enables the oscillator to generate the pulse train.

At 210, hysteretic voltage controller 108 continues to enable oscillator 106 to generate pulse train PT, i.e., to keep the pulse train turned on. Thus, output voltage Vout and output current Iout continue to rise. Method 200 repeats or cycles through operations 208, 210, and 222 over time to control or regulate output voltage Vout to stay within a voltage window between the overvoltage threshold and the undervoltage threshold.

At 220, hysteretic current controller 110 detects whether output current Iout rises above or exceeds the overcurrent threshold, which represents an overcurrent condition. To do this, hysteretic current controller 110 compares output current Iout to the overcurrent threshold. When output current Iout exceeds the overcurrent threshold, flow proceeds to 222. When output current Iout does not exceed the overcurrent threshold, flow proceeds to 210.

At 222, hysteretic current controller 110 drives enable voltage EN to its disable level to disable oscillator 106, which stops generating pulse train PT, i.e., to turn off the pulse train. In response, switching transistor T stops switching on and off, and output current Iout falls. While oscillator 106 is disabled and output current Iout falls, hysteretic current controller 110 detects whether output current Iout falls below the undercurrent threshold, which represents an undercurrent condition. To do this, hysteretic current controller 110 compares output current Iout to the undercurrent threshold. While output current Iout does not fall below the undercurrent threshold, hysteretic current controller 110 continues to disable oscillator 106 and thereby suppress pulse train PT. When output current Iout falls below the undercurrent threshold, hysteretic current controller 110 causes voltage EN to transition to its enable level, which re-enables oscillator 106 to supply pulse train PT to switching transistor T. In response, output current Iout rises above the undercurrent threshold toward the overcurrent threshold. In summary, operation 222 disables oscillator 106 to suppress or turn off pulse train PT until output current Iout falls below the undercurrent threshold, and then re-enables the oscillator to generate or turn-on the pulse train.

Method 200 repeats or cycles through operations 220, 222, and 210 over time to control or regulate output current Iout.

Repeating operations 206, 208, and 210 implements a hysteretic voltage control loop, while repeating operations 220, 222, and 210 implements a hysteretic current control loop. The two loops operate concurrently and independently of one another. Thus, oscillator 106 (and hence pulse train PT) may be enabled and disabled under control of the hysteretic voltage control loop, and also under control of the hysteretic current control loop. In alternative embodiments, either of the control loops may be omitted.

Method 200 alternately enables and disables oscillator 106 (and thus pulse train PT) to regulate output voltage Vout based on the overvoltage and undervoltage thresholds and feeback voltage Vfb, and to limit output current Iout based on the overcurrent and undercurrent thresholds and current feedback Ifb. Such back-and-forth enabling and disabling of oscillator 106 causes skipping or dropping of pulses of pulse train PT during time periods when the oscillator is disabled that would otherwise be present were the oscillator enabled during the time periods. Dropping pulses "thins" a density of the pulses to reduce output voltage Vout and output current Iout. This represents "pulse-skipping" or "pulse-dropping" modulation that intermittently drops one or more pulses of pulse train PT to regulate output voltage Vout and output current Iout. Various waveforms that show the pulse-dropping will be described below in connection with FIGS. 3-6.

When performing method 200, power supply system 100 is configured to implement fast transition time between detecting that output voltage Vout (or output current Iout) has passed a threshold and then transitioning oscillator 106 (and hence the pulse train) from on to off or vice versa to satisfy the conditions of method 200. Specifically, the transition time is within a switching cycle. For example, the time from detecting that output voltage Vout (or output current Iout) exceeds the overvoltage threshold (or the overcurrent threshold) to transitioning oscillator 106 (and hence pulse train PT) from on to off is less than the switching cycle. Similarly, the time from detecting that output voltage Vout (or output current Iout) fall below the undervoltage threshold (or the undercurrent threshold) to transitioning oscillator 106 (and hence pulse train PT) from off to on is less than the switching cycle.

Returning again to FIG. 1, circuit-level details of switching power supply 102, oscillator 106, hysteretic voltage controller 108, hysteretic current controller 110, current sensor 112, and voltage sensor 114 circuitry are now described. Amplifiers and/or comparators described below may be powered by a common power voltage Vcc. Also, circuit components and signals may be referred to by their labels, only. For example, capacitor C1 and output voltage Vout may be referred to simply as "C1" and "Vout," respectively.

Switching power supply 102 is one example of many different types of switching power supplies and power inverters to which the hysteretic voltage and current control techniques presented herein may be applied. The switching power supply may include multiple switching transistors, such as two switching transistors, four switching transistors, and so on. For example, the switching power supply may be a four-quadrant switching power supply, such as an H-bridge switching power supply that employs four switching transistors.

Switching power supply 102 receives input voltage Vin generated by a voltage source V1 at an input terminal or node N1 of the switching power supply, converts the input voltage to output voltage Vout and output current Iout at an output node N2 of the switching power supply, and applies Vout and Iout to load Rload connected between N2 and ground. Switching power supply 102 includes a transformer L having a primary winding L1 and a secondary winding L2 coupled to each other by a magnetic core. Primary winding L1 has a high-side and a low-side respectively connected to N1 and a node N3. Secondary winding L2 has a high-side and a low-side that is connected to ground. Switching transistor T (e.g., a power field effect transistor (FET)) includes a source-drain current path connected in series with current sensor 112 between N3 and ground, and a control terminal or gate driven to receive pulse train PT through buffer 107. Switching power supply 102 further includes a diode DI and a capacitor Cout. Diode DI has an anode and a cathode respectively connected to the high-side of secondary winding L2 and N2. Cout is connected to N2 and ground, across output load Rload.

In operation, when pulse train PT is turned on, switching transistor T switches on an off responsive to cycles of the pulse train. That is, each cycle or period of the pulse train includes an on-time and an off-time that switch switching transistor T on and off, respectively. Switching transistor T and associated circuitry of switching power supply 102 described above deliver energy caused by the switching of the switching transistor to Cout and Rload, which causes Vout and Iout to rise over time. On the other hand, when pulse train T is turned off, switching transistor T stops switching on and off, and stops delivering energy to Cout. Then, energy stored in Cout delivers output power to Rload, which causes Vout and Iout to fall over time.

Oscillator 106 includes a comparator U1, a capacitor C1, and a feedback resistor R1 connected in series with each other. Series-connected C1 and R1 are connected to ground through C1 and to a first output of U1 through R1. A junction of series-connected C1 and R1 at a node N5 is connected to a negative input of U1. Enable voltage EN developed at N5 controls oscillator 106. When C1 is charged, enable voltage EN is high, which enables oscillator 106. Conversely, when C1 is selectively discharged (under control of hysteretic voltage controller 108 and hysteretic current controller 110), enable voltage EN is driven low, which disables oscillator 106. Oscillator 106 also includes a voltage divider comprising a resistor R3 and a resistor R4 connected in series with each other. Series-connected R3 and R4 are connected to Vcc through R4 and to ground through R3. A voltage-divider junction between R3 and R4 is connected to a positive input of U1 and to a second output of U1 through a feedback resistor R2. The second output of U1, connected to the base or gate of switching transistor T through buffer 107, generates pulse train PT.

Voltage sensor 114 includes a voltage divider comprising a resistor R17 and a resistor R18 connected in series. Series-connected R17 and R18 are connected to N2 through R17 and to ground through R18. A voltage-divider junction of resistors R17 and R18 derives Vfb indicative of Vout, and provides the same to hysteretic voltage controller 108.

Hysteretic voltage controller 108 includes a comparator U2 and a potential divider, comprising a voltage reference component U6 and a resistor R26 connected in series with each other between Vcc and ground, to derive a reference voltage Vref at a voltage-divider junction between U6 and R26. The potential divider provides Vref to a negative input of U2, and a positive input of U2 receives Vfb from voltage sensor 114. U2 compares Vref to Vfb (which indirectly compares Vout against the hysteretic voltage thresholds) to produce a compare result or control voltage Vcontrol at an output of U2, which is fed back to the positive input through a feedback resistor R16, which establishes hysteresis. Hysteretic voltage controller 108 also includes a transistor Q1 (e.g., a bipolar junction transistor (BJT)) having (i) a base to receive Vcontrol through a resistor R24, and (ii) a collector-emitter current path that is connected to and between ground and N5 of oscillator 106.

When Vcontrol is low, Q1 is turned off, and C1 of oscillator 106 does not discharge, which keeps enable voltage EN (i.e., node N5) high to enable the oscillator. On the other hand, when Vcontrol is high, Q1 is turned on and discharges C1, which drives enable voltage EN low to disable oscillator 106. U2 and Q1 cooperate to control oscillator 106 as described above, for example, to disable oscillator 106 when Vout is above the overvoltage threshold, and to enable the oscillator when Vout is below the undervoltage threshold. U2 and Q1 have a fast response time. That is, a transition time between detecting the overvoltage (or undervoltage) condition and transitioning oscillator 106 to the appropriate on or off state occurs within a switching cycle.

Hysteretic current controller 110 includes a comparator U3 and a potential divider, comprising a resister R65 and a resistor R64 connected in series with each other between a node (e.g., the voltage-divider junction between U6 and R26) held at Vref and ground, respectively, to derive a U3 reference voltage at a voltage-divider junction between R65 and R64. The potential divider provides the U3 reference voltage to a negative input of U3, and a positive input of U3 receives Ifb from current sensor 112. U3 compares the U3 reference voltage to Ifb (which indirectly compares Iout against the hysteretic current thresholds) to produce a compare result or control voltage ILimit at an output of U3, which is fed back to the positive input through a feedback resistor R63, which establishes hysteresis. Hysteretic current controller 110 also includes a transistor Q2 (e.g., a BJT) having (i) a base to receive ILimit through a resistor R71, and (ii) a collector-emitter current path that is connected to and between ground and N5 of oscillator 106.

When ILimit is low, Q2 is turned off, and C1 of oscillator 106 does not discharge, which keeps enable voltage EN high to enable the oscillator. On the other hand, when ILimit is high, Q2 is turned on and discharges C1, which drives enable voltage EN low to disable oscillator 106. U3 and Q2 cooperate to control oscillator 106 as described above, for example, to disable oscillator 106 when Iout is above the upper current threshold, and to enable the oscillator when Iout is below the lower threshold. U3 and Q2 have a fast response time.

The outputs of Q1 and Q2 are wire-OR'd together so that EN remains high until the output of Q1 or the output of Q2 drives EN low.

In an alternative embodiment, oscillator 106 is always enabled (i.e., free-runs) to generate pulse train PT. Oscillator 106 applies pulse train PT to switching transistor through a gate or base that receives the pulse train and the enable voltage EN as a control signal that causes the gate to selectively pass the pulse train to the switching transistor when EN is high and not pass the pulse train when EN is low.

Example voltage waveforms that occur at various nodes of power supply system 100 when operating under hysteretic voltage and/or current control are described below in connection with FIGS. 3-6. The voltage waveforms present voltages and times by way of example, only. Other voltages and times are possible.

FIG. 3 shows example voltage (V) waveforms for control voltage Vcontrol, pulse train PT applied to switching transistor T, and output voltage Vout in power supply system 100 when operating under hysteretic voltage control. The voltage waveforms show or reveal the following sequence of hysteretic events.

a. Interval 1: oscillator 106 (U1) is enabled by hysteretic voltage controller 108 to produce pulse train PT to drive switching transistor T, until Vout reaches the overvoltage threshold of 27.7 V. Vcontrol produced by U2 is low (which keeps output enable EN high) during interval 1.
b. Interval 2: when Vout rises above overvoltage threshold 27.7 V, Vcontrol transitions to high, turning on Q1 to drive enable voltage EN low, which disables oscillator 106. Switching transistor T stops switching and Vout begins to fall toward undervoltage threshold 27.6 V. Output power to Rload is provided by energy stored in Cout. During interval 2, pulse train PT is turned off, which drops or skips all pulses of the pulse train that would otherwise be present had the pulse train not been turned off (i.e., if the pulse train had remained on). This is an example of pulse-dropping to reduce Vout.
c. Interval 3: when Vout falls below undervoltage threshold 27.6 V, Vcontrol goes low, turning off Q1 (allowing enable voltage EN to transition to high), which enables oscillator 106 to turn on pulse train PT. Switching transistor T starts switching again and Vout begins to rise again toward overvoltage threshold 27.7 V.
d. The intervals repeat over time to regulate Vout so that Vout remains within a hysteretic voltage window between the overvoltage and undervoltage thresholds. In the example of FIG. 3, the hysteretic voltage window is approximately 100 mV. Larger or smaller windows may be defined.

While FIG. 3 shows voltage waveforms associated with hysteretic voltage control performed by hysteretic voltage controller 108, it is understood that alternative waveforms for hysteretic current limiting/control may be similar to those shown in FIG. 3, except that the waveforms for Vout and Vcontrol (which is responsive to comparisons of Vout against the overvoltage and undervoltage thresholds) are replaced by alternative waveforms for Iout and ILimit (which is responsive to comparisons of Iout against the overcurrent and undercurrent thresholds), respectively.

Figure 4A:
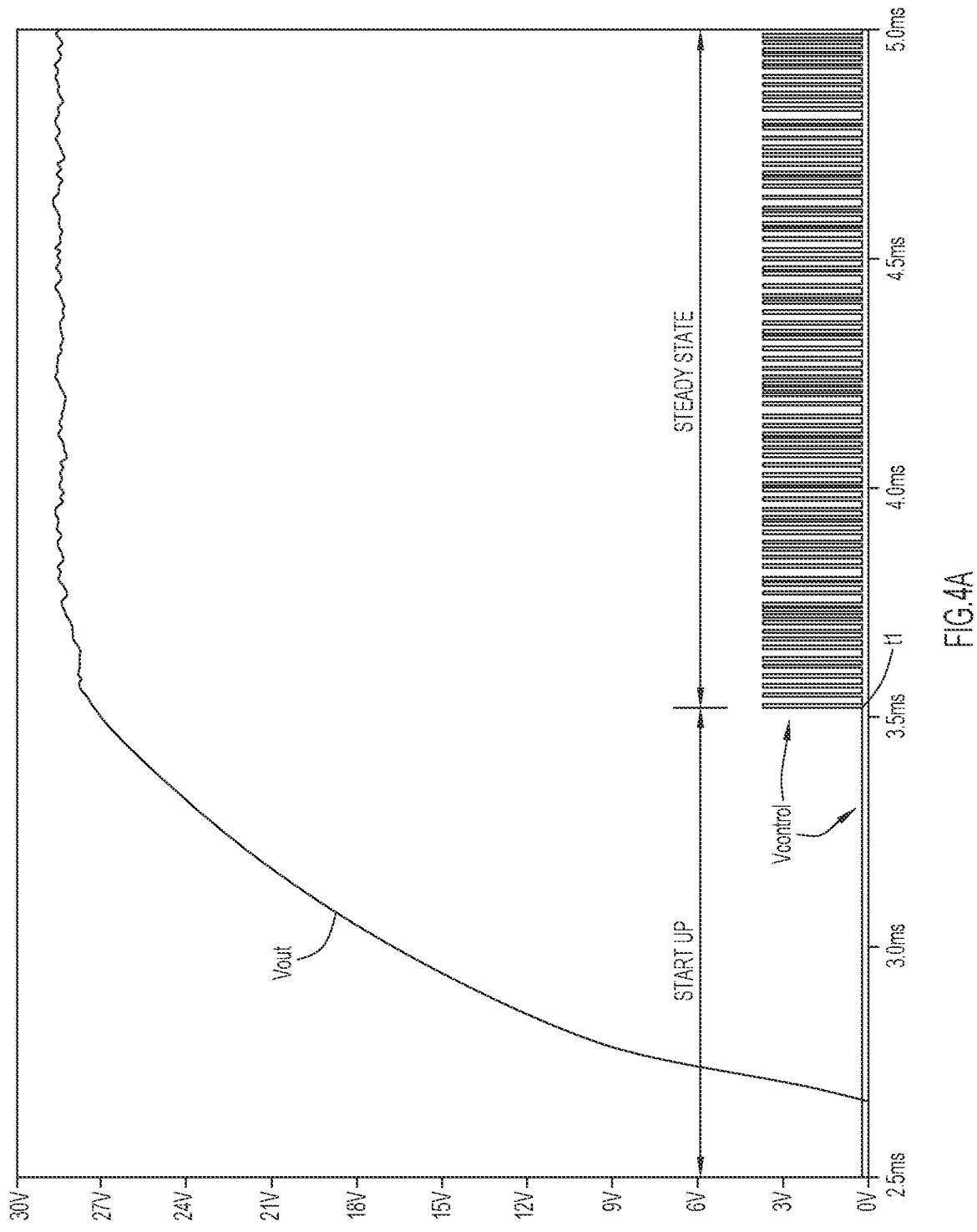
FIG. 4A shows example waveforms for the output voltage and the control voltage during startup and steady state operation of the hysteretic voltage control.

FIG. 4A shows example waveforms for Vout and Vcontrol spanning startup and steady state operations of power supply system 100. During startup, Vcontrol is low (i.e., below the overvoltage threshold), so oscillator 106 generates pulse train PT. Vout rises from 0 V to above the overvoltage threshold (e.g., around 27 V) at time t1. Thereafter, Vcontrol toggles between low and high to alternately enable and disable oscillator 106, respectively, to regulate Vout in the steady state.

Figure 4B:
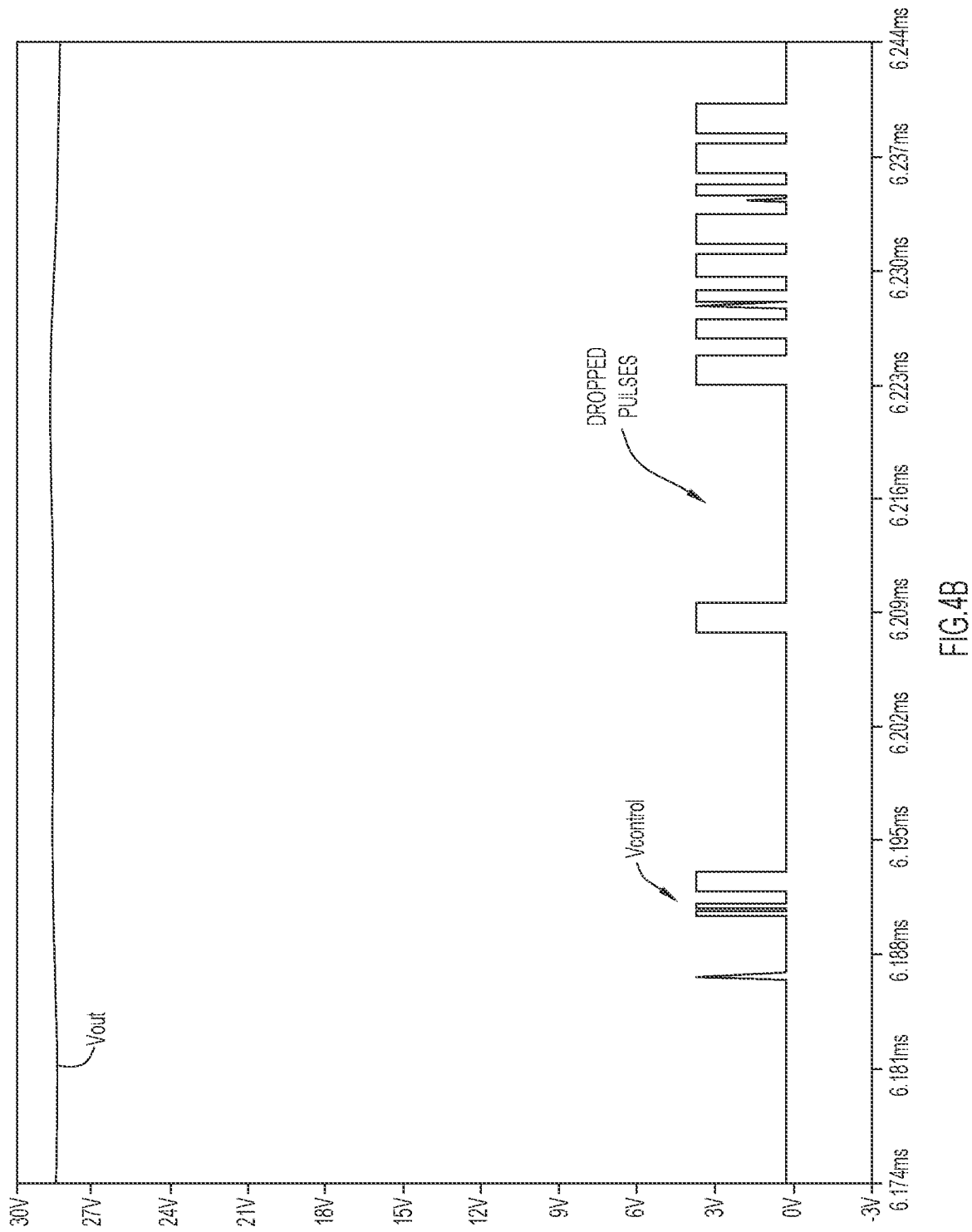
FIG. 4B shows the example waveforms of FIG. 4A in an expanded view during the steady state operation.

FIG. 4B shows the example waveforms of FIG. 4A, expanded or "zoomed-in" between times 6.17 ms and 6.244 ms of the steady state. As shown in FIG. 4B, Vcontrol sporadically transitions between low and high levels to sporadically drop pulses of pulse train PT to regulate Vout.

Figure 5A:
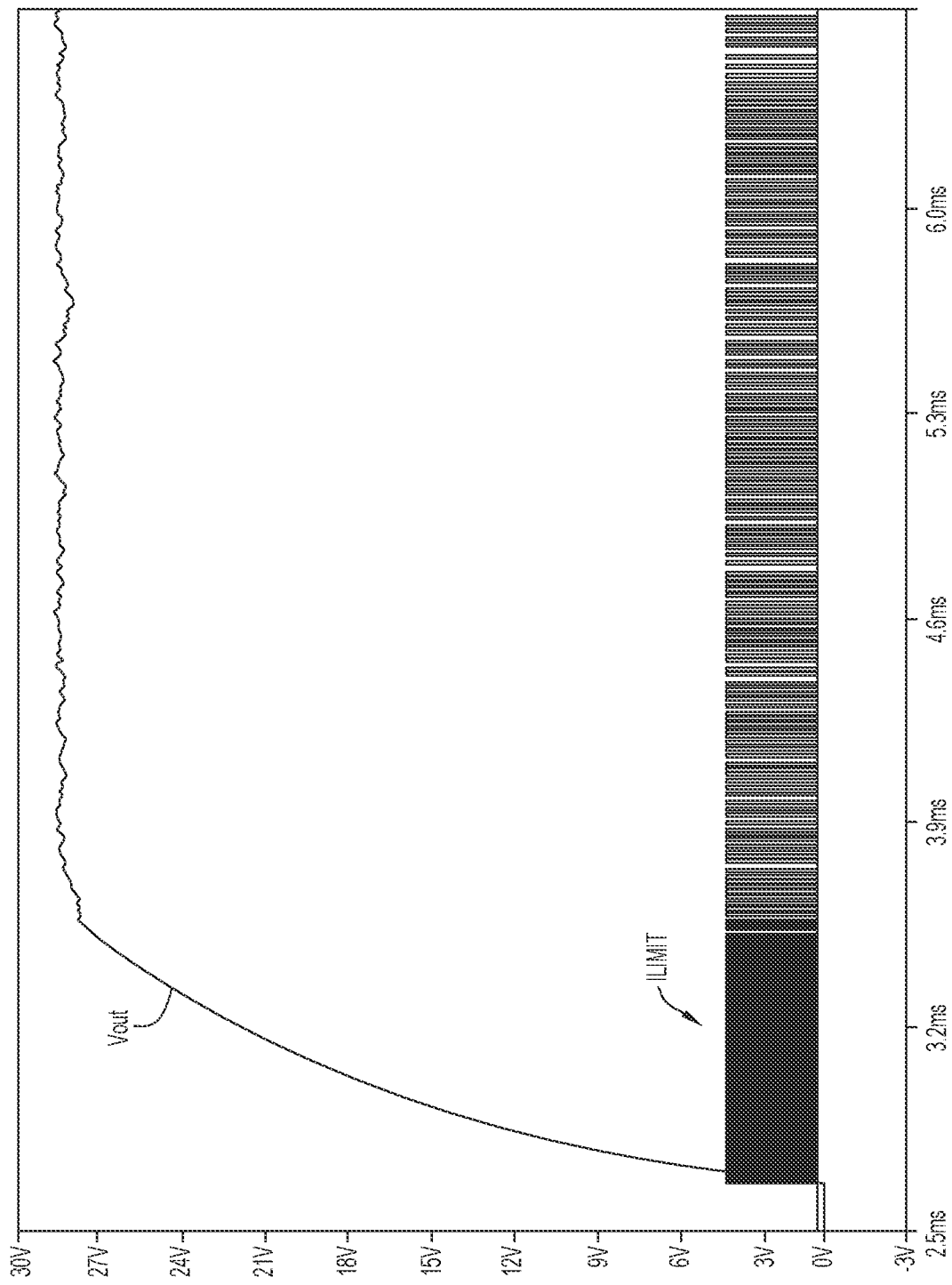
FIG. 5A shows example waveforms for the output voltage and a control voltage to control the pulse train during startup and steady state operation of the hysteretic current control.

FIG. 5A shows example waveforms for Vout and ILimit spanning startup and steady state. During startup, ILimit toggles between low and high to limit output current into the short circuit of Cout, while oscillator 106 generates pulse train PT. Vout and Iout rise until Iout exceeds the overcurrent threshold. Thereafter, ILimit toggles between low and high to alternately enable and disable oscillator 106, respectively, to regulate Iout in a steady state, as described above.

Figure 5B:
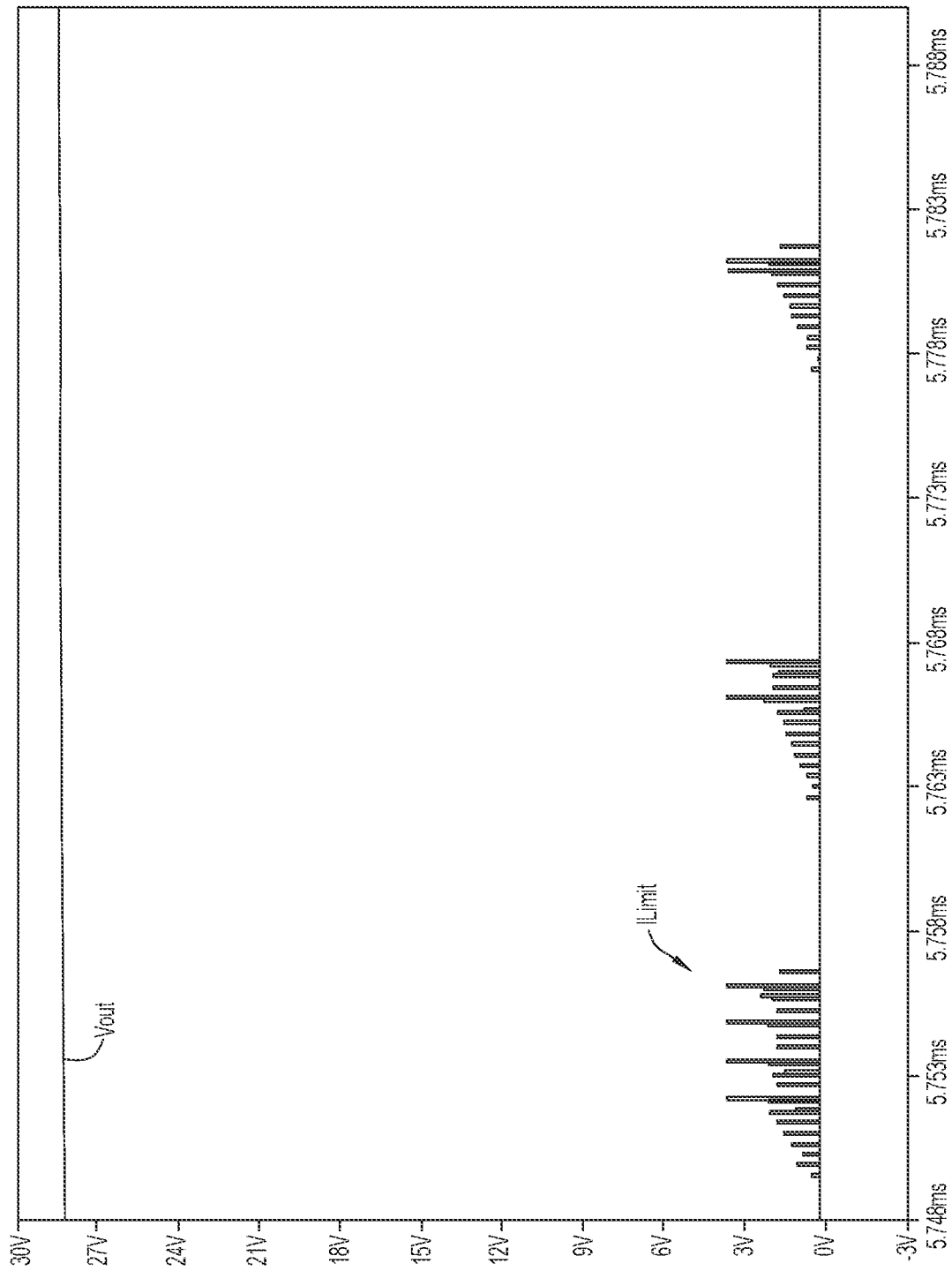
FIG. 5B shows the example waveforms of FIG. 5A in an expanded view during the steady state operation.

FIG. 5B shows the example waveforms of FIG. 5A, expanded or "zoomed-in" between times 6.17 ms and 6.244 ms of the steady state. As shown in FIG. 4B, ILimit sporadically transitions between low and high levels to sporadically drop pulses of pulse train PT to regulate Iout.

Figure 6:
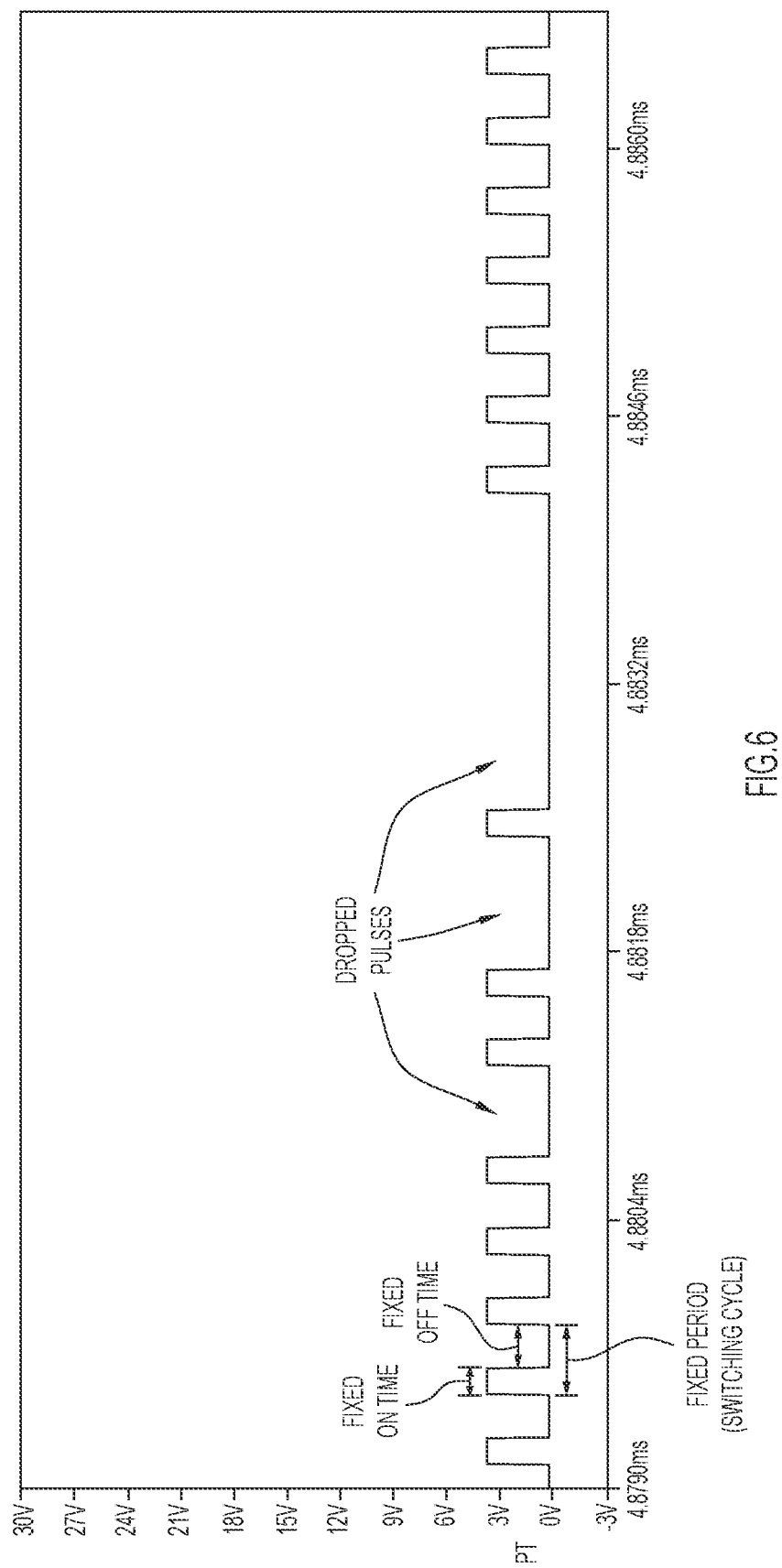
FIG. 6 shows an example waveform for the pulse train that includes dropped pulses.

FIG. 6 is an example waveform for pulse train PT as applied to switching transistor T and that includes intermittently dropped pulses as indicated in the figure. As shown, the pulses of pulse train PT have a fixed on-time, a fixed off-time, and a fixed period.

Figure 7:
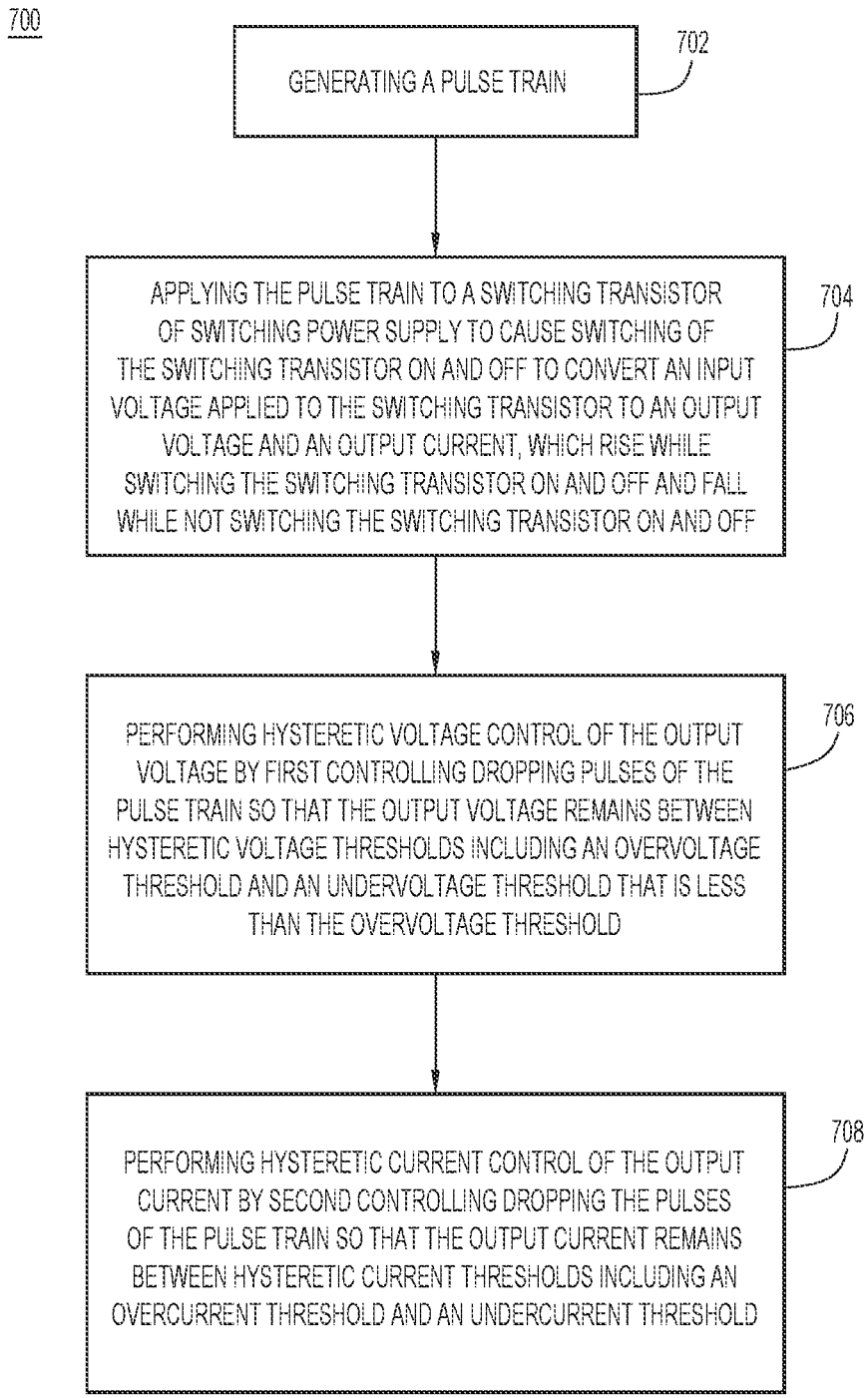
FIG. 7 is a flowchart of an example method of concurrent hysteretic voltage control and hysteretic current control that may be performed in the power supply system.

FIG. 7 is a flowchart of an example method 700 of hysteretic control performed in power supply system that includes a switching power supply with a switching transistor. In other embodiments, the switching power supply may include multiple switching transistors that are controlled in a similar manner to that described below. Operations of method 700 are described above.

702 includes generating a pulse train having pulses with a fixed on-time, a fixed off-time, and a fixed frequency (i.e., a fixed period).

704 includes applying the pulse train to the switching transistor of the switching power supply to cause switching of the switching transistor on and off to convert an input voltage applied to the switching transistor to an output voltage and an output current (of the switching power supply), which rise while switching the switching transistor on and off and fall while not switching the switching transistor on and off. Initially, applying the pulse train may cause the output voltage and the output current to rise from low levels, e.g., zero levels.

Next operations 706 and 708 respectively refer to "first" and "second" controlling dropping pulses of pulse train PT by turning on and off pulse train PT. In this context, the terms "first" and "second" respectively identify, and distinguish between, controlling dropping pulses performed by hysteretic voltage controller 108 and controlling dropping pulses performed by hysteretic current controller 110.

706 includes performing hysteretic voltage control of the output voltage by "first" controlling dropping pulses of pulse train PT (e.g., by controlling oscillator 106 to turn the pulse train on and off, which causes intermittent dropping of the pulses) so that the output voltage remains between the hysteretic voltage thresholds including the overvoltage threshold and the undervoltage threshold that is less than the overvoltage threshold. First controlling dropping the pulses may include:

a. While applying the pulse train, upon detecting that the output voltage rises above the overvoltage threshold, turning off the pulse train (which causes pulse dropping) to cause the output voltage to fall and, after turning off the pulse train, keeping the pulse train turned off while the output voltage falls from above the overvoltage threshold toward the undervoltage threshold. Detecting that the output voltage rises above the overvoltage threshold includes comparing the output voltage to the overvoltage threshold.

b. While the pulse train is turned off in (a), upon detecting that the output voltage falls below the undervoltage threshold, turning on the pulse train (which stops dropping pulses) to cause the output voltage to rise and, after turning on the pulse train, keeping the pulse train turned on while the output voltage rises above the undervoltage threshold toward the overvoltage threshold. Detecting that the output voltage falls below the undervoltage threshold includes comparing the output voltage to the undervoltage threshold.

c. The hysteretic voltage control repeats operations (a) and (b).

708 includes performing hysteretic current control of the output current by second controlling dropping the pulses of the pulse train (e.g., controlling oscillator 106 to turn on and turn off the pulse train to intermittently drop and not drop the pulses) so that the output current remains between the hysteretic current thresholds including the overcurrent threshold and the undercurrent threshold. Second controlling dropping the pulses may include:

a. Upon detecting that the output current exceeds the overcurrent threshold, turning off the pulse train to cause the output current to fall and, after turning off the pulse train, keeping the pulse train turned off while the output current falls from above the overcurrent threshold toward the undercurrent threshold. Detecting that the output current rises above the overcurrent threshold includes comparing the output current to the overcurrent threshold.

b. While the pulse train is turned off from (a), upon detecting that the output current falls below the undercurrent threshold, turning on the pulse train to cause the output current to rise and, after turning on the pulse train, keeping the pulse train turned on (i.e., continuing to apply the pulse train) while the output current rises above the undercurrent threshold toward the overcurrent threshold. Detecting that the output current falls below the undercurrent threshold includes comparing the output current to the undercurrent threshold.

c. The hysteretic current control repeats operations (a) and (b).

Method 700 also includes performing operations 706 and 708 concurrently and independently of each other. Method 700 also includes deriving the undervoltage threshold, the overvoltage threshold, and the overcurrent threshold, and the undercurrent threshold from a common reference threshold, which reduces circuitry. Method 700 performs operations 706 and 708 such that a transition time between detecting that the output voltage (or output current) has passed a threshold and turning on or off the pulse train is less than a switching cycle, i.e., less than a period or PRI of the pulse train. Operation 706 or operation 708 may be omitted from the method.

Hysteretic voltage/current control turns off switching of switching transistor T when Vout/Iout exceeds the overvoltage/overcurrent threshold, but does not turn on switching of the switching transistor until Vout/Iout fall below the undervoltage/undercurrent threshold. The hysteretic voltage/current control protects the power supply from damage due to overloads and short-circuits, and provides smooth, "monotonic" power supply startup behavior. Moreover, the pulse skipping causes a non-periodic switching signature. This "spread-spectrum" switching potentially reduces radiated and conducted emissions because such random switching introduces random peaks and valleys in the steady-state output voltage ripple, input current ripple, and input voltage ripple produced by the switching. In an example, the output voltage ripple magnitude is constrained to less than 2% peak-to-peak ripple.

The fixed on-time of the pulses in pulse train PT produced by oscillator 106 is beneficial because the on-time establishes a maximum Volt*second product across the power supply magnetics, which allows a designer to minimize a size of the transformer and/or inductor core, based on a fixed V*s product. The fixed off-time of the pulses in pulse train PT produced by oscillator 106 is beneficial because the fixed-off time establishes for the designer a minimum time provided for a reset of the magnetic core(s) in the power supply.

Because the hysteretic control loop (current and/or voltage) implemented in the embodiments does not use a classic control loop with an error amplifier, the control loop is able to respond to input voltage transients and output load transients in a single switching cycle, which yields a fast transient response time compared to a conventional control loop.

In some aspects, the techniques described herein relate to a method of controlling a switching power supply, including: generating a pulse train; applying the pulse train to a switching transistor of the switching power supply to cause switching of the switching transistor on and off to convert an input voltage applied to the switching transistor to an output voltage, which rises while switching the switching transistor on and off and falls while not switching the switching transistor on and off; and performing hysteretic voltage control of the output voltage by first controlling dropping pulses of the pulse train so that the output voltage remains between hysteretic voltage thresholds including an overvoltage threshold and an undervoltage threshold that is less than the overvoltage threshold.

In some aspects, the techniques described herein relate to a method, wherein: generating includes generating the pulse train to have pulses with a fixed on-time and a fixed off-time and generating the pulse train at a fixed frequency.

In some aspects, the techniques described herein relate to a method, wherein first controlling dropping the pulses includes: while applying the pulse train, upon detecting that the output voltage rises above the overvoltage threshold, turning off the pulse train to cause the output voltage to fall; and while the pulse train is turned off, upon detecting that the output voltage falls below the undervoltage threshold, turning on the pulse train to cause the output voltage to rise.

In some aspects, the techniques described herein relate to a method, wherein a time between detecting that the output voltage rises above the overvoltage threshold and turning off the pulse train is less than a period of pulse train.

In some aspects, the techniques described herein relate to a method, wherein first controlling dropping the pulses further includes: after turning off the pulse train, keeping the pulse train turned off while the output voltage falls from above the overvoltage threshold to below the undervoltage threshold.

In some aspects, the techniques described herein relate to a method, wherein: applying the pulse train includes applying the pulse train while the output voltage rises above the undervoltage threshold toward the overvoltage threshold.

In some aspects, the techniques described herein relate to a method, further including: initially applying the pulse train to cause the output voltage to rise from below the undervoltage threshold to above the undervoltage threshold.

In some aspects, the techniques described herein relate to a method, wherein: detecting that the output voltage rises above the overvoltage threshold includes comparing the output voltage to the overvoltage threshold; and detecting that the output voltage falls below the undervoltage threshold includes comparing the output voltage to the undervoltage threshold.

In some aspects, the techniques described herein relate to a method, wherein switching of the switching transistor on and off causes the switching power supply to generate an output current that rises and falls in correspondence with an output load, and the method further includes: performing hysteretic current control of the output current by second controlling dropping the pulses of the pulse train so that the output current remains between hysteretic current thresholds including an overcurrent threshold and an undercurrent threshold.

In some aspects, the techniques described herein relate to a method, wherein second controlling dropping the pulses includes: upon detecting that the output current exceeds the overcurrent threshold, turning off the pulse train to cause the output current to fall; and upon detecting that the output current falls below the undercurrent threshold, turning on the pulse train to cause the output voltage to rise.

In some aspects, the techniques described herein relate to a method, wherein: turning off the pulse train includes turning off the pulse train while the output current falls from above the overcurrent threshold to below the undercurrent threshold.

In some aspects, the techniques described herein relate to a method, further including concurrently performing the hysteretic current control and the hysteretic voltage control.

In some aspects, the techniques described herein relate to a method, further including: deriving the undervoltage threshold, the overvoltage threshold, and the overcurrent threshold, and the undercurrent threshold from a common reference threshold.

In some aspects, the techniques described herein relate to a method, wherein: generating includes, by an oscillator, generating the pulse train when the oscillator is enabled, wherein controlling dropping the pulses includes controlling disabling the oscillator to cause the oscillator to stop generating the pulses.

In some aspects, the techniques described herein relate to a power supply system including: a switching power supply including a switching transistor; an oscillator to generate a pulse train and apply the pulse train to the switching transistor to cause switching of the switching transistor on and off to convert an input voltage applied to the switching transistor to an output voltage, which rises while switching the switching transistor on and off and falls while not switching the switching transistor on and off; and a hysteretic voltage controller configured to perform hysteretic voltage control of the output voltage by first controlling dropping pulses of the pulse train so that the output voltage remains between hysteretic voltage thresholds including an overvoltage threshold and an undervoltage threshold that is less than the overvoltage threshold.

In some aspects, the techniques described herein relate to a power supply system, wherein: The oscillator is configured to generate the pulse train to have pulses with a fixed on-time, a fixed off-time, and a fixed frequency.

In some aspects, the techniques described herein relate to a power supply system, wherein the hysteretic voltage controller is configured to perform first controlling dropping the pulses by: while the pulse train is applied to the switching transistor, upon detecting that the output voltage rises above the overvoltage threshold, turning off the pulse train to cause the output voltage to fall; and while the pulse train is turned off, upon detecting that the output voltage falls below the undervoltage threshold, turning on the pulse train to cause the output voltage to rise.

In some aspects, the techniques described herein relate to a power supply system, wherein the hysteretic voltage controller is further configured to perform first controlling dropping the pulses by: after turning off the pulse train, keeping the pulse train turned off while the output voltage falls from above the overvoltage threshold to below the undervoltage threshold.

In some aspects, the techniques described herein relate to a power supply system, wherein: the hysteretic voltage controller is configured to perform detecting that the output voltage rises above the overvoltage threshold by comparing the output voltage to the overvoltage threshold; and the hysteretic voltage controller is configured to perform detecting that the output voltage falls below the undervoltage threshold by comparing the output voltage to the undervoltage threshold.

In some aspects, the techniques described herein relate to a power supply system, wherein switching of the switching transistor on and off causes the switching power supply to generate an output current that rises and falls in correspondence with an output load, and the power supply system further includes: a hysteretic current controller configured to perform hysteretic current control of the output current by second controlling dropping the pulses of the pulse train so that the output current remains between hysteretic current thresholds including an overcurrent threshold and an undercurrent threshold.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of controlling a switching power supply, comprising:
    generating a pulse train;
    applying the pulse train to a switching transistor of the switching power supply to cause switching of the switching transistor on and off to convert an input voltage applied to the switching transistor to an output voltage, which rises while switching the switching transistor on and off and falls while not switching the switching transistor on and off; and
    performing hysteretic voltage control of the output voltage by first controlling dropping pulses of the pulse train so that the output voltage remains between hysteretic voltage thresholds including an overvoltage threshold and an undervoltage threshold that is less than the overvoltage threshold.

2. The method of claim 1, wherein:
generating includes generating the pulse train to have pulses with a fixed on-time and a fixed off-time and generating the pulse train at a fixed frequency.

3. The method of claim 1, wherein first controlling dropping the pulses includes:
while applying the pulse train, upon detecting that the output voltage rises above the overvoltage threshold, turning off the pulse train to cause the output voltage to fall; and
while the pulse train is turned off, upon detecting that the output voltage falls below the undervoltage threshold, turning on the pulse train to cause the output voltage to rise.

4. The method of claim 3, wherein a time between detecting that the output voltage rises above the overvoltage threshold and turning off the pulse train is less than a period of pulse train.

5. The method of claim 3, wherein first controlling dropping the pulses further includes:
after turning off the pulse train, keeping the pulse train turned off while the output voltage falls from above the overvoltage threshold to below the undervoltage threshold.

6. The method of claim 3, wherein:
applying the pulse train includes applying the pulse train while the output voltage rises above the undervoltage threshold toward the overvoltage threshold.

7. The method of claim 3, further comprising:
initially applying the pulse train to cause the output voltage to rise from below the undervoltage threshold to above the undervoltage threshold.

8. The method of claim 3, wherein:
detecting that the output voltage rises above the overvoltage threshold includes comparing the output voltage to the overvoltage threshold; and
detecting that the output voltage falls below the undervoltage threshold includes comparing the output voltage to the undervoltage threshold.

9. The method of claim 1, wherein switching of the switching transistor on and off causes the switching power supply to generate an output current that rises and falls in correspondence with an output load, and the method further comprises:
performing hysteretic current control of the output current by second controlling dropping the pulses of the pulse train so that the output current remains between hysteretic current thresholds including an overcurrent threshold and an undercurrent threshold.

10. The method of claim 9, wherein second controlling dropping the pulses includes:
upon detecting that the output current exceeds the overcurrent threshold, turning off the pulse train to cause the output current to fall; and
upon detecting that the output current falls below the undercurrent threshold, turning on the pulse train to cause the output voltage to rise.

11. The method of claim 10, wherein:
turning off the pulse train includes turning off the pulse train while the output current falls from above the overcurrent threshold to below the undercurrent threshold.

12. The method of claim 9, further comprising concurrently performing the hysteretic current control and the hysteretic voltage control.

13. The method of claim 9, further comprising:
deriving the undervoltage threshold, the overvoltage threshold, and the overcurrent threshold, and the undercurrent threshold from a common reference threshold.

14. The method of claim 1, wherein:
generating includes, by an oscillator, generating the pulse train when the oscillator is enabled,
wherein controlling dropping the pulses includes controlling disabling the oscillator to cause the oscillator to stop generating the pulses.

15. A power supply system comprising:
a switching power supply including a switching transistor;
an oscillator to generate a pulse train and apply the pulse train to the switching transistor to cause switching of the switching transistor on and off to convert an input voltage applied to the switching transistor to an output voltage, which rises while switching the switching transistor on and off and falls while not switching the switching transistor on and off; and
a hysteretic voltage controller configured to perform hysteretic voltage control of the output voltage by first controlling dropping pulses of the pulse train so that the output voltage remains between hysteretic voltage thresholds including an overvoltage threshold and an undervoltage threshold that is less than the overvoltage threshold.

16. The power supply system of claim 15, wherein:
The oscillator is configured to generate the pulse train to have pulses with a fixed on-time, a fixed off-time, and a fixed frequency.

17. The power supply system of claim 15, wherein the hysteretic voltage controller is configured to perform first controlling dropping the pulses by:
while the pulse train is applied to the switching transistor, upon detecting that the output voltage rises above the overvoltage threshold, turning off the pulse train to cause the output voltage to fall; and
while the pulse train is turned off, upon detecting that the output voltage falls below the undervoltage threshold, turning on the pulse train to cause the output voltage to rise.

18. The power supply system of claim 17, wherein the hysteretic voltage controller is further configured to perform first controlling dropping the pulses by:
after turning off the pulse train, keeping the pulse train turned off while the output voltage falls from above the overvoltage threshold to below the undervoltage threshold.

19. The power supply system of claim 17, wherein:
the hysteretic voltage controller is configured to perform detecting that the output voltage rises above the overvoltage threshold by comparing the output voltage to the overvoltage threshold; and
the hysteretic voltage controller is configured to perform detecting that the output voltage falls below the undervoltage threshold by comparing the output voltage to the undervoltage threshold.

20. The power supply system of claim 15, wherein switching of the switching transistor on and off causes the switching power supply to generate an output current that rises and falls in correspondence with an output load, and the power supply system further comprises:

a hysteretic current controller configured to perform hysteretic current control of the output current by second controlling dropping the pulses of the pulse train so that the output current remains between hysteretic current thresholds including an overcurrent threshold and an undercurrent threshold.

* * * * *